US012598068B2

(12) United States Patent
Hudon-Voyer et al.

(10) Patent No.: US 12,598,068 B2
(45) Date of Patent: Apr. 7, 2026

(54) SYSTEMS AND METHODS FOR HANDLING ENCRYPTED DATA

(71) Applicant: Apple Inc., Cupertino, CA (US)

(72) Inventors: Raphael Hudon-Voyer, Montreal (CA); Sebastien Fontaine, Montreal (CA); Frank Andries van den Berg, San Jose, CA (US); Pradeepa Krishnamoorthy, L'Ile-Perrot (CA); Benoit L. Floc'h, Montreal (CA); Varun A. Vora, Campbell, CA (US); Vincent Pozzuoli, Montreal (CA)

(73) Assignee: Apple Inc., Cupertino, CA (US)

( * ) Notice: Subject to any disclaimer, the term of this patent is extended or adjusted under 35 U.S.C. 154(b) by 160 days.

(21) Appl. No.: 18/641,224

(22) Filed: Apr. 19, 2024

(65) Prior Publication Data

US 2025/0330309 A1     Oct. 23, 2025

(51) Int. Cl.
H04L 29/06      (2006.01)
H04L 9/08      (2006.01)
H04L 9/30      (2006.01)
H04L 9/32      (2006.01)

(52) U.S. Cl.
CPC .......... H04L 9/0891 (2013.01); H04L 9/3073 (2013.01); H04L 9/3247 (2013.01)

(58) Field of Classification Search
None
See application file for complete search history.

(56) References Cited

U.S. PATENT DOCUMENTS

2020/0120023 A1 *   4/2020   Munson ................ G06F 21/602

FOREIGN PATENT DOCUMENTS

WO      WO-2023150359 A1 *   8/2023   ............. G06Q 20/02

* cited by examiner

*Primary Examiner* — Andrew J Steinle
(74) *Attorney, Agent, or Firm* — Kilpatrick Townsend & Stockton LLP

(57) ABSTRACT

A method may include receiving, by a first computing system and from a second computing system, an encrypted first key encrypted with a first public-private key pair. The encrypted first key may include a hash of at least a portion of sensitive data. The method may include decrypting, by the first computing system, the encrypted first key using a private key of the first public-private key pair to access a first key. The method may include validating, by the first computing system, the first key. The method may include re-encrypting, by the first computing system, the first key using a symmetric key to generate a re-encrypted key. The method may include transmitting, by the first computing system, the re-encrypted key to the second computing system such that the sensitive data may be decrypted.

20 Claims, 8 Drawing Sheets

RECEIVE AN ENCRYPTED FIRST KEY 302

DECRYPT THE ENCRYPTED KEY 304

VALIDATE THE FIRST KEY 306

RE-ENCRYPT THE FIRST KEY 308

TRANSMIT THE RE-ENCRYPTED KEY 310

Figure 1:
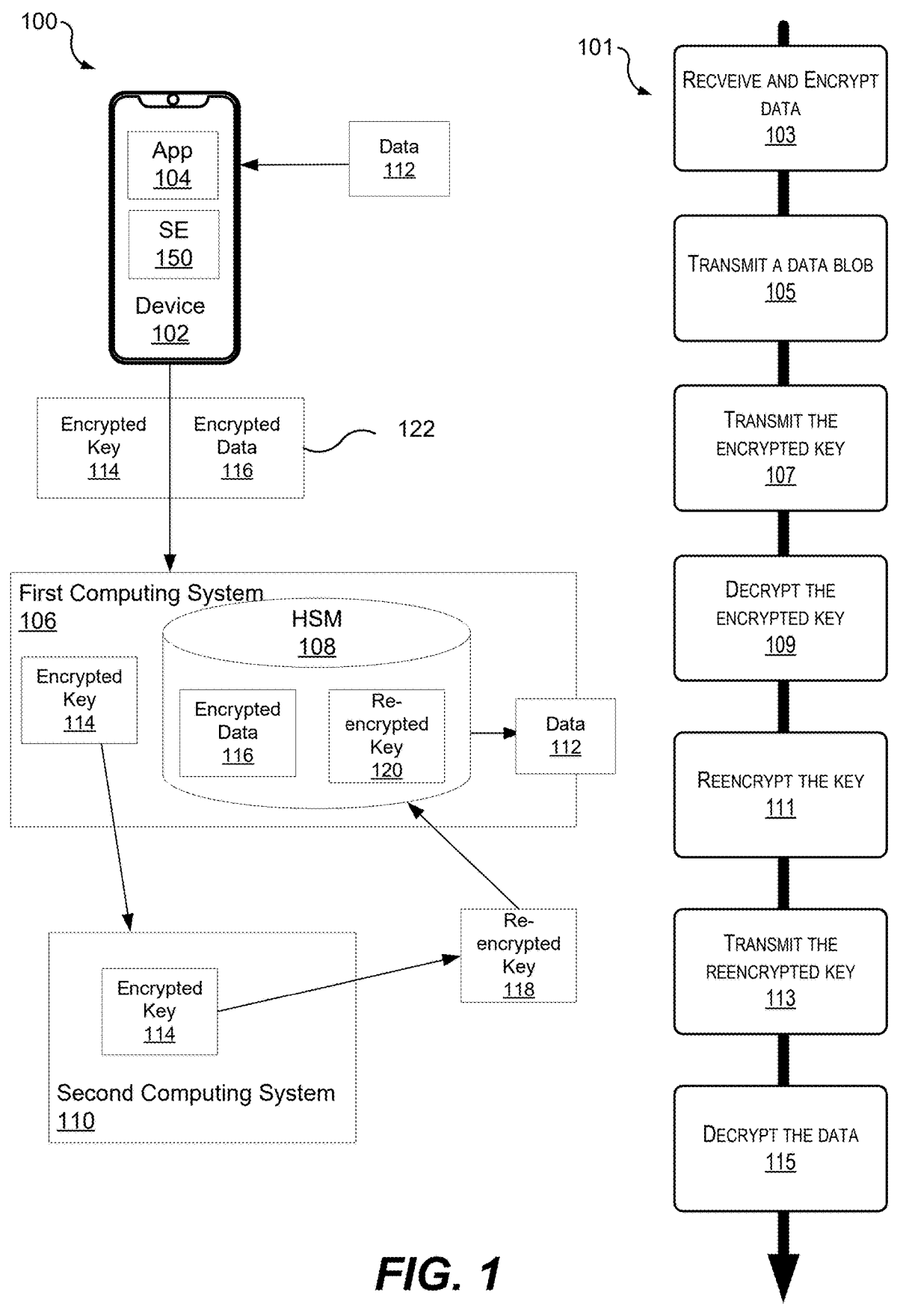

100

App
104

Data
112

SE
150

Device
102

Encrypted
Key
114

Encrypted
Data
116

122

First Computing System
106

HSM
108

Encrypted
Key
114

Encrypted
Data
116

Re-
encrypted
Key
120

Data
112

Re-
encrypted
Key
118

Encrypted
Key
114

Second Computing System
110

101

RECVEIVE AND ENCRYPT
DATA
103

TRANSMIT A DATA BLOB
105

TRANSMIT THE
ENCRYPTED KEY
107

DECRYPT THE
ENCRYPTED KEY
109

REENCRYPT THE KEY
111

TRANSMIT THE
REENCRYPTED KEY
113

DECRYPT THE DATA
115

Data
206

App
204

202

SE
250

214

208

Data
206

216

210

Encrypted Key
214
- Unique Key
- Device ID/Certificate
- Session Token
- Key ID
- Server Key ID

200

224

230

220

HSM
228

Data
206

210

Data
206

SYSTEMS AND METHODS FOR HANDLING ENCRYPTED DATA

BACKGROUND

Sensitive data may be transferred between various entities in order to be processed, analyzed, used, etc. Some entities may use the sensitive data directly, while others may be intermediaries, needed by other entities to access and use the sensitive data. However, the more often the sensitive data is transferred, and the more entities involved, the bigger the risk of exposure of the sensitive data is. Thus, there is a need to find secure ways of transferring and otherwise handling sensitive data.

BRIEF SUMMARY

A method may include receiving, by a first computing system and from a second computing system, an encrypted first key encrypted with a first public-private key pair. The encrypted first key may include a hash of at least a portion of sensitive data. The method may include decrypting, by the first computing system, the encrypted first key using a private key of the first public-private key pair to access a first key. The method may include validating, by the first computing system, the first key. The method may include re-encrypting, by the first computing system, the first key using a symmetric key to generate a re-encrypted key. The method may include transmitting, by the first computing system, the re-encrypted key to the second computing system such that the sensitive data may be decrypted.

In some embodiments, the method may include generating, by an application of the first computing system, the first key. The method may also include generating, by the application of the first computing system, the hash of the portion of the sensitive data. The method may also include encrypting, by the application of the first computing system, the sensitive data using the first key to generate encrypted data; encrypting, by the application of the first computing system, the first key and the hash of the at least a portion of the sensitive data using the first public-private key pair to generate the encrypted first key. The method may also include transmitting, by the application of the first computing system, the encrypted first key and the encrypted data to the second computing system.

In some embodiments, the second computing system may receive a data blob including the sensitive data and the encrypted first key from an application of the first computing system. The second computing system may split the data blob and store the sensitive data. The sensitive data may include health data. The first key may be unique to the sensitive data. The sensitive data may include one or more of a server identifier, a session token, a certificate, a transaction identifier, or a user device identifier. The first key may be associated with a symmetrical encryption scheme. The first computing system may include a hardware security module. The re-encrypted key may include a signature from the first computing system such that the second computing system authenticates the re-encrypted first key.

A computing system may include one or more processors and a computer-readable medium including instructions that, when executed by the one or more processors, cause the computing system to perform operations. According to the operations, the computing system may receive, from an entity, an encrypted first key encrypted with a first public-private key pair. The encrypted first key may include a hash of at least a portion of sensitive data. The computing system may decrypt the encrypted first key using a private key of the first public-private key pair to access a first key. The computing system may validate the first key. The computing system may re-encrypt the first key using a symmetric key to generate a re-encrypted key. The computing system may transmit the re-encrypted key to the entity such that the sensitive data may be decrypted.

In some embodiments, the computing system may generate, by the application of the computing system, the first key. The computing system may generate, by the application of the computing system, the hash of the at least a portion of the sensitive data. The computing system may encrypt, by the application of the computing system, the sensitive data using the first key to generate encrypted data. The computing system may encrypt, by the application of the computing system, the first key and the hash of the at least a portion of the sensitive data using the first public-private key pair to generate the encrypted first key. The computing system may transmit, by the application of the first computing system, the encrypted first key and the encrypted data to the entity. In some embodiments, the application may be hosted on a user device configured to collect sensitive data via optical code. In some embodiments, the sensitive data may include at least one of card holder data, a personal identification number, or a primary account number. In some embodiments, the application causes the sensitive data and/or the encrypted sensitive data to be deleted after transmitting the encrypted first key and the encrypted sensitive data to the entity.

A non-transitory computer-readable medium may include instructions that, when executed by one or more processors, cause the one or more processors to perform operations. The operations may include receiving, by a first computing system and from a second computing system, an encrypted first key encrypted with a first public-private key pair. The encrypted first key may include a hash of at least a portion of sensitive data. The operations may include decrypting, by the first computing system, the encrypted first key using a private key of the first public-private key pair to access a first key. The operations may include validating, by the first computing system, the first key. The operations may include re-encrypting, by the first computing system, the first key using a symmetric key to generate a re-encrypted key. The operations may include transmitting, by the first computing system, the re-encrypted key to the second computing system such that the sensitive data may be decrypted.

In some embodiments, the operations may include generating, by an application of the first computing system, the first key. The operations may include generating, by the application of the first computing system, a hash of a at least a portion of the sensitive data. The operations may include encrypting, by the application of the first computing system, the sensitive data using the first key to generate encrypted data. The operations may include encrypting, by the application of the first computing system, the first key and the hash of the at least a portion of the sensitive data using the first public-private key pair to generate the encrypted first key. The operations may include transmitting, by the application of the first computing system, the encrypted first key and the encrypted data to the second computing system.

In some embodiments, the application may be hosted on a user device configured to collect sensitive data via near field communication, magnetic strip reading, and/or a user input. The sensitive data may include one or more of a server identifier, a session token, a certificate, a transaction identifier, or a user device identifier. The encrypted first key may be associated with a symmetrical encryption scheme. The application may be hosted on a user device configured to collect sensitive data via optical code. The application may cause the sensitive data and/or the encrypted sensitive data to be deleted after transmitting the encrypted first key and the encrypted sensitive data to the entity.

BRIEF DESCRIPTION OF THE DRAWINGS

FIG. 1 illustrates a system and a process for processing sensitive data, according to certain embodiments.

DETAILED DESCRIPTION

Figure 2A:
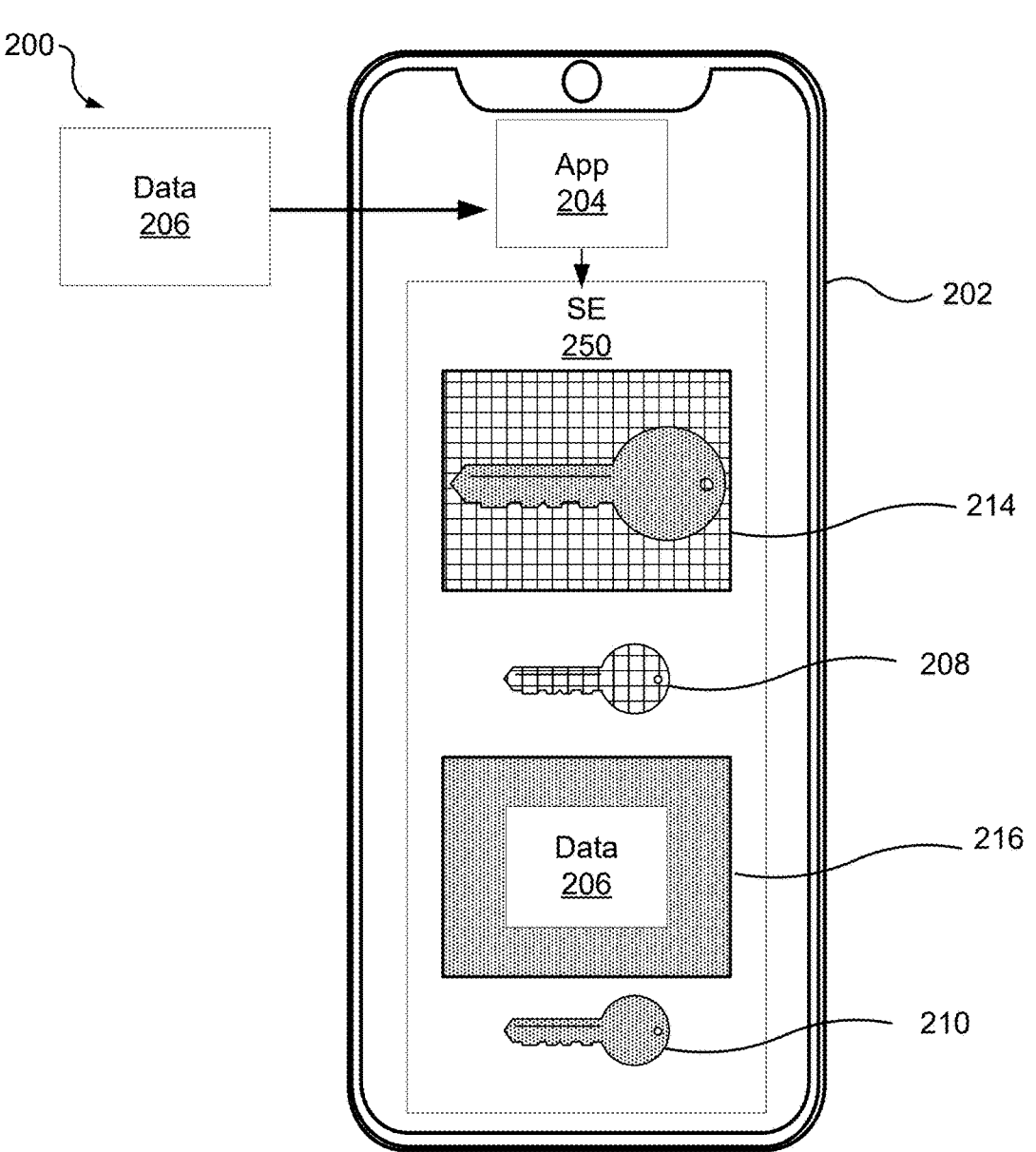
FIGS. 2A-2E illustrate a system 200 for receiving data, encrypting the data, and processing the encrypted data, according to certain embodiments.

Several parties may be involved in the processing of sensitive data. Each time the sensitive data is transferred, a risk of exposure may be created. As processing schemes for sensitive data have grown more complex, the number of parties involved and transfers required have grown in number. To reduce the risk of exposure of sensitive data, sensitive data is often encrypted. The encrypted sensitive data may be transferred to the necessary parties, decrypted by the parties, then re-encrypted and transferred again as needed. This means that all of the parties involved may have access to the decrypted sensitive data. Not only do multiple transfers of the sensitive data create more risks of exposure, but each copy of de-crypted (or un-encrypted) sensitive data also creates a risk of exposure.

Besides the risk created for the owner of the sensitive data, exposure—or even the handling and/or transfer of the sensitive data—may create risk for each entity handling the sensitive data. This may be true for all kinds of sensitive data. For example, heavily regulated data such as health data, may have strict requirements and imposed liabilities for the handling of sensitive health data. Transferring medical records, prescriptions, and other medical data between users, doctors, insurance companies, etc, thus may create a risk for every entity in the chain. In another example, sensitive intelligence data may be transferred between various government entities and/or contractors, where each party in that chain is at risk in case of exposure of the sensitive data. In yet another example, the handling and transfer of financial data may also be heavily regulated and require all entities involved to take measures to minimize the risk of exposure.

Because even the transfer of sensitive data brings a risk of exposure, minimizing the number of entities who send and/or receive sensitive data may be beneficial. In some systems, however, one entity maybe required to verify and/or decrypt some or all of the sensitive data, where another entity may need to process the data. Continuing the example of financial data from above, a merchant may accept credit cards as payment. The merchant may then utilize a second entity to receive and manage card holder data, and a third entity to process the transaction. Finally, a fourth entity may then be involved in completing the transaction. Card holder data may be considered sensitive data, and thus minimizing the number of parties that can access unencrypted card holder data may be desired. At the same time, all of the parties involved may need access to at least some of the card holder data in order to properly perform their function and complete the transaction. However, some of the parties may only need to verify certain information about the transaction and/or card holder data. These parties may therefore not need full access to the unencrypted data, minimizing the number of transfers and parties handling copies of sensitive data.

One method of minimizing the parties involved may include using a split blob design to transfer and process sensitive data. Sensitive data may be received via an application running on a user device. The application may generate a unique key and use the unique key to encrypt the sensitive data. The application may then encrypt the unique key using a first public-private key pair. The encrypted unique key and the encrypted sensitive data may then be transferred to an entity as a data blob. Upon receiving the data blob, entity may split the data blob, storing the encrypted sensitive data. The first entity, however, may not have the either the public or private portion of the first public-private key pair or the unique key. The first entity therefore may not be able to access or process the encrypted data or the unique key. The first entity may then transfer the encrypted unique key to a second entity, associated with the application. Because the second entity is associated with the application (and/or vice versa), the second entity may have access to at least a portion of the first public-private key pair. The second entity may then decrypt the encrypted unique key, and re-encrypt the unique key using a second key, shared with the first entity. The second entity may then transfer the re-encrypted unique key to the first entity. Using the second key, the first entity may then decrypt the re-encrypted unique key and use the unique key to decrypt the sensitive data. The sensitive data may be processed as needed. Although the second entity is involved in the encryption and decryption of the sensitive data, the second entity may not receive a copy of the sensitive data, whether unencrypted or not. Also, because the first entity only receives and processes the sensitive data, the first entity's risk may be minimized because there is no transfer of sensitive data from the first entity to the second entity.

In the following description of the above process, sensitive data should be understood to include financial data, health data, classified data, and/or any other type of sensitive data. Any reference to financial data and/or terms are merely made as an example. It should be understood that the systems and methods described herein may be used to handle (or transfer, process, etc.) any type of sensitive data.

FIG. 1 illustrates a system 100 and a process 101 for processing sensitive data, according to certain embodiments. The system 100 may include a user device 102 with an application 104, an first computing system 106 with a hardware security module (HSM) 108, and an second computing system 110. The user device 102 may also include a secure element (SE) 150. The user device 102 may be a mobile device, phone, computer, laptop, tablet, point of sale system, or any other suitable device. The user device 102 may include components and functionalities that enable the user device to accept sensitive data via methods such as wireless communication (e.g., Bluetooth, near-field communication (NFC), WiFi, etc.), optical codes (e.g., a QR code, bar code, etc.), magnetic strip reading, or any other suitable method. The application 104 may be associated with the second computing system 110106. The application 104 may be configured to accept sensitive data by one or more of the methods described above and encrypt some or all of the sensitive data received. The application 104 may additionally or alternatively be configured to transmit and receive data to from the SE 150. For example, the application 104 may cause the sensitive data to be transmitted to the SE 150 to be encrypted. The sensitive data may be returned by the SE 150 such that only an authorized entity (e.g., the second computing system 110) may decrypt the sensitive data. Thus, even if the device 102 receives sensitive data, the sensitive data may only be accessed by the authorized entity, and not the application 104 and/or the user of the user device 102.

The first computing system 106 may include one or more components configured to perform some or all of the processes and methods described herein. The one or more computing systems may include one or more processors, computer-readable memories, and other such components. Some or all of the computing systems may be cloud-based systems and/or physical machines and devices. The first computing system 106 may be associated with a third party entity, not associated with the device 102 (or a user thereof) and/or the second computing system 110. For example, the first computing system 106 may be associated with a payment services processor (PSP), enabling the device 102 to accept credit card information and process payments. Thus, the first computing system 106 may include one or more systems configured to receive sensitive data (e.g., card holder data) and decrypt and process the sensitive data as needed to process a transaction from the device 102. The HSM 108 may be one or more HSMs configured to securely store and process sensitive data. The HSM 108 (and therefore data thereon) may only be accessible by the first computing system 106. Processing of sensitive data (e.g., decryption) may be performed on the HSM 108 exclusively, such that the sensitive data is not exposed outside of the HSM 108.

The second computing system 110 may include one or more components configured to perform some or all of the processes and methods described herein. The one or more computing systems may include one or more processors, computer-readable memories, and other such components. Some or all of the second computing system 110 may be cloud-based systems and/or physical machines and devices. The second computing system 110 may be associated an entity further associated with the device 102 and/or the application 104. The entity may also be associated with one or more other components of the device 102 (e.g., an operating system of the device 102, etc.) Because the second computing system 110 may be associated with the device 102, the second computing system 110 may communicate certain information with the device 102 that is inaccessible to other parties (e.g., public-private key pairs, etc.). Thus, the application 104 and/or other components of the device 102 may be configured to handle sensitive data such that the sensitive data is inaccessible to other parties (and/or encrypted such that only the second computing system 110 may decrypt the sensitive data). Although not shown in FIG. 1, the second computing system 110 may include an HSM. Some or all processing and handling of sensitive data may be done on the HSM, such that any sensitive data is only unencrypted on the HSM.

At 103, the device 102 may receive data 112. The data 112 may be sensitive data. For example, the device 102 may be associated with a merchant or other such party, and configured to receive cardholder data in order to process a transaction. The data 112, in this case, may be cardholder data. In other examples, the data 112 may be classified data, health data, or other such data. The application 104 may receive the data 112 and transmit some or all of the data 112 to the SE 150. The SE 150 may identify one or more characteristics of the data 112. For example, the SE 150 may identify a card number, a personal identification number (PIN), a primary account number (PAN), and other such characteristics of the data 112. The SE 150 may then generate a unique key. The unique key may be a symmetrical encryption key. The SE 150 may utilize some or all of the characteristics of the data 112 to generate the unique key. For example, the SE 150 may include a hash of the PIN, the PAN, or other such characteristics, to generate the unique key. Additionally or alternatively, the SE 150 may randomly generate the unique key. The SE 150 may then encrypt the data 112 using the unique key to create encrypted data 116.

The SE 150 may then access a first public-private key pair. The first public-private key pair may be shared between the device 102 (i.e., the SE 150 and/or the application 104) and the second computing system 110. The first public-private key pair may be unique to the device 102 and/or the application 104. For example, a similar device running a different instance of the application 104 may include a different public-private key pair, used for a similar purpose (e.g., transferring sensitive data). However, because the public-private key pairs are unique to each device, only the respective devices and the second computing system 110 may decrypt the sensitive data transferred by each respective device. Using the first-public private key pair, the application 104 may encrypt the unique key, creating encrypted key 114. The result of encrypting the data 112 with a symmetrical key (e.g., the unique key) and encrypting the unique key with an asymmetrical key (e.g., the first public-private key pair) may result in a data blob 122, encrypted using hybrid public key encryption (HPKE). Although some of the embodiments shown and described in FIG. 1 may use HPKE, one of ordinary skill in that art would recognize many other alternatives and embodiments.

In another example, the second computing system 110 may include the first public-private key pair common to all devices (e.g., using a Elliptic-curve Diffie-Hellman (ECDH) protocol). The service public key (i.e., the public portion of the first public-private key pair; sometime, the "sPK") may be sent to all devices (e.g., the user device 102) during an initialization process. The service private key (i.e., the private portion of the first public-private key pair; sometimes, the "sSK") may only be held by the second computing system 110. The user device 102 (e.g., the SE 150) may then include a second public-private key pair generated for each transfer of sensitive data. A private portion of the second public-private key pair (sometimes, the "device private key (dSK)") may be held solely by the user device 102. A public portion of the second public-private key pair (sometimes, the "device public key (dPK)") may be included in the encrypted key 114. When the SE 150 encrypts the unique key, the SE 150 may generate an ECDH key (a symmetric key) using the dSK and the sPK. The ECDH key may then be used to encrypt the unique key to generate the encrypted key 114. Similarly, when the second computing system subsequently decrypts the encrypted key 114, the second computing system 110 may utilize the sSK and the dPK to generates the ECDH key. As the dSK and dPK may change at every data transfer, the ECDH key used to encrypt and transmit the encrypted key 114 may also change. Thus, each data blob generated by the SE 150 (e.g., the data blob 122) may be encrypted using a unique ECDH key.

At 105, the application 104 may transmit the data blob 122 to the first computing system 106. The application 104 may receive some or all of the data blob 122 from the SE 150. The application 104 may transmit the data blob 122 at the time the data 112 is received or may transmit the data blob 122 at some point in the future.

At 107, the first computing system 106 may split the data blob 122 and transmit the encrypted key 114 to the second computing system 110. The encrypted key 114 may include a hash of some or all of the data 112 (e.g., as metadata included with the encrypted key 114). The first computing system 106 may store the encrypted data 116. In some embodiments, the first computing system 106 may store the encrypted key 114 on the HSM 108 and/or the other computer memory. In other embodiments, the first computing system 106 may not store the encrypted key 114. Because the encrypted data 116 is encrypted with the unique key (a symmetrical key), there may be no way for the first computing system 106 to access data 112 without the unique key. The unique key, however, is itself encrypted using the first public-private key pair (whether alone or via the ECDH protocol described above), shared only between the device 102 (and/or the SE 150) and the second computing system 110. Therefore, the first computing system 106 may not be able to decrypt the encrypted data 116 to process the data 112. In the example that the first computing system 106 is a PSP, the first computing system 106 may not be able to process the data 112, and the transaction not completed. Thus, the first computing system 106 may transfer the encrypted key 114 to the second computing system 110.

At 109, the second computing system 110 may receive the encrypted key 114 and decrypt the encrypted key 114 using the first public-private key pair (e.g., via the ECDH protocol). In some embodiments, the computing system may decrypt the encrypted key 114 using an HSM. The second computing system 110 may then verify one or more of the characteristics of the data 112, used to generate and/or included in the unique key. For example, the application 104 may include a session token associated with the data 112 (or related transaction) with the unique key. The application 104 may additionally include a certificate indicating the device 102, a key identifier (identifying the first public-private key, a second public-private key pair, or some other key), the PIN hash, PAN hash, and/or other information. Thus, when the second computing system 110 decrypts the encrypted key 114, the second computing system 110 may access the information included with the unique key. Similarly, the first computing system 106 may include some or all of the information when transmitting the encrypted key 114 to the second computing system 110.

For example, the application 104 may include the session token associated with the data 112 with the unique key in the encrypted key 114. The application 104 may also include the session token (either encrypted or unencrypted) in the data blob 122 (e.g., as metadata with the encrypted key 114) transmitted to the first computing system 106. Then, when the second computing system 110 decrypts the encrypted key 114, the second computing system 110 may verify that the session token included with the encrypted key 114 correctly identifies the first computing system 106. Then, the second computing system 110 may verify the hash of the encrypted data 116 matches a hash of data received by the first computing system 106. The second computing system 110 may verify that the encrypted key 114 is actually associated with the data 112 before providing the unique key to the first computing system 106. The second computing system 110 may also (via the hash of the sensitive data 116) verify that the first computing system 106 has the correct encrypted data. Although the above example uses a session token, other information may additionally or alternatively be included. One of ordinary skill in the art would recognize many different possibilities and configurations.

At 111, the second computing system 110 may re-encrypt the unique key to generate a re-encrypted key 118. The second computing system 110 may use a second symmetric key to re-encrypt the unique key and generate the re-encrypted key 118. The second symmetric key may be shared only between the computing systems 106 and 110. Thus, the re-encrypted key 118 may only be accessed by the computing systems 106 and 110.

At 113, the second computing system 110 may transmit the re-encrypted key 118 to the first computing system 106. Then, at 115, the first computing system 106 may decrypt the re-encrypted key 118 using the second symmetric key, accessing the unique key. The first computing system 106 may then decrypt the encrypted data 116 to access the data 112, and process the data 112 to complete an associated transaction. By utilizing the system 100 and process 101 above, the risk of exposing the data 112 may be reduced. The encrypted data 116 may only be transmitted once, between the device 102 and the first computing system 106. Because the first computing system 106 cannot access the data 112 without the involvement of the second computing system 110, a breach of the first computing system 106 may not expose the data 112. Furthermore, neither of the data 112 and the encrypted data 116 may be received by the second computing system 110. A breach of the second computing system 110 may therefore not expose the data 112.

FIGS. 2A-2E illustrate a system 200 for receiving data, encrypting the data, and processing the encrypted data, according to certain embodiments. The system 200 may be similar to some or all of the system 100 described in FIG. 1. The system 200 may include a user device 202 running an application 204 and an SE 250. The user device 202 may be similar to the device 102 and the application 204 may be similar to the application 104. The user device 202 may include a mobile device, phone, computer, laptop, tablet, point of sale system, or any other suitable device. The user device 202 may include components and functionalities that enable the user device to accept sensitive data via methods such as wireless communication (e.g., Bluetooth, NFC, WiFi, etc.), optical codes (e.g., a QR code, bar code, etc.), magnetic strip reading, or any other suitable method. The user device 202 may also include other components not shown. For example, the user device 202 may include an external strip reader, configured to read data from a magnetic strip and transfer the data to the user device 202.

The application 204 may be associated with an entity responsible for processing sensitive data (e.g., a PSP). The SE 250 may be a component of an operating system, running on the user device 202. An entity associated with the user device 202 and/or the SE 250 may be a manufacturer of the user device 202, a software developer for the user device 202, and/or provide services for the user device 202. The application 204 may additionally or alternatively be configured to transmit and receive data to from the SE 250. For example, the application 204 may cause the sensitive data to be transmitted to the SE 250 to be encrypted. The sensitive data may be returned by the SE 205 such that only an authorized entity (e.g., the second computing system 110 in FIG. 1) may decrypt the sensitive data. Thus, even if the device 202 receives sensitive data, the sensitive data may only be accessed by the authorized entity, and not the application 204 and/or the user of the user device 202.

Similarly, the SE 250 may be configured to generate and/or store keys used to encrypt and decrypt sensitive data, without exposing the keys to unauthorized access. For example, the SE 250 may include or access a server key 208. The server key 208 may be a public portion of a public-private key pair (e.g., an sPK). The entity associated with the user device 202 may exclusively decrypt data encrypted with the server key 208. In some embodiments, the server key 208 may be unique to the user device 202.

The user device 202 may receive data 206 via NFC, Bluetooth, card reader, etc. In the example shown in FIG. 2, the data 206 may be cardholder data received as part of a transaction, and therefore be considered sensitive data. While the user device 202 may receive the data 206, sensitive portions of the data 206 may be obscured from a user of the user device 202. For example, the user device 202 may display an identifier of associated with the data 206 (e.g., a first name, time, transaction ID, etc.), but any sensitive data (e.g., card number, PIN, PAN, etc.) may not be visible or accessible.

Upon receiving the data 206, the application 204 may transmit some or all of the data to the SE 250. The SE 250 may generate a unique key 210. The unique key 210 may be a randomly generated symmetrical key. In some embodiments, the unique key 210 may be at least partially based on a hash of sensitive data included in the data 206. For example, the unique key 210 may include a hash of the PIN, a hash of the PAN, or other such information. The application 204 may use the unique key 210 to encrypt the data 206 to create encrypted data 216.

Then, the application 204 may encrypt the unique key 210 using the server key 208 (e.g., using the public portion of the server key 208), creating encrypted key 214. The encrypted key 210 may be encrypted using an Advanced Encryption Standard (AES). The application 204 may include other information with the encrypted key 214, such as a session token, a transaction ID, a device identifier (e.g., MAC ID. IP address, etc.), a device certificate (e.g., generated using a public-private key pair), server key ID (e.g., the public key of the server key 208), and other such information. For example, the SE 250 may concatenate the encrypted key 214 with metadata (e.g., the session key, the data hash, the device id, etc.) to generate a concatenated payload. The concatenated payload may then be encrypted again. Thus, a third party (e.g., a PSP) may see the metadata without accessing the encrypted key 214. Then, the encrypted payload may be concatenated with the encrypted data 216. Because the encrypted key 214 and/or other information is encrypted using the server key 208, only the entity associated with the device 202 may decrypt and access the unique key 210 and the other information.

Figure 2B:
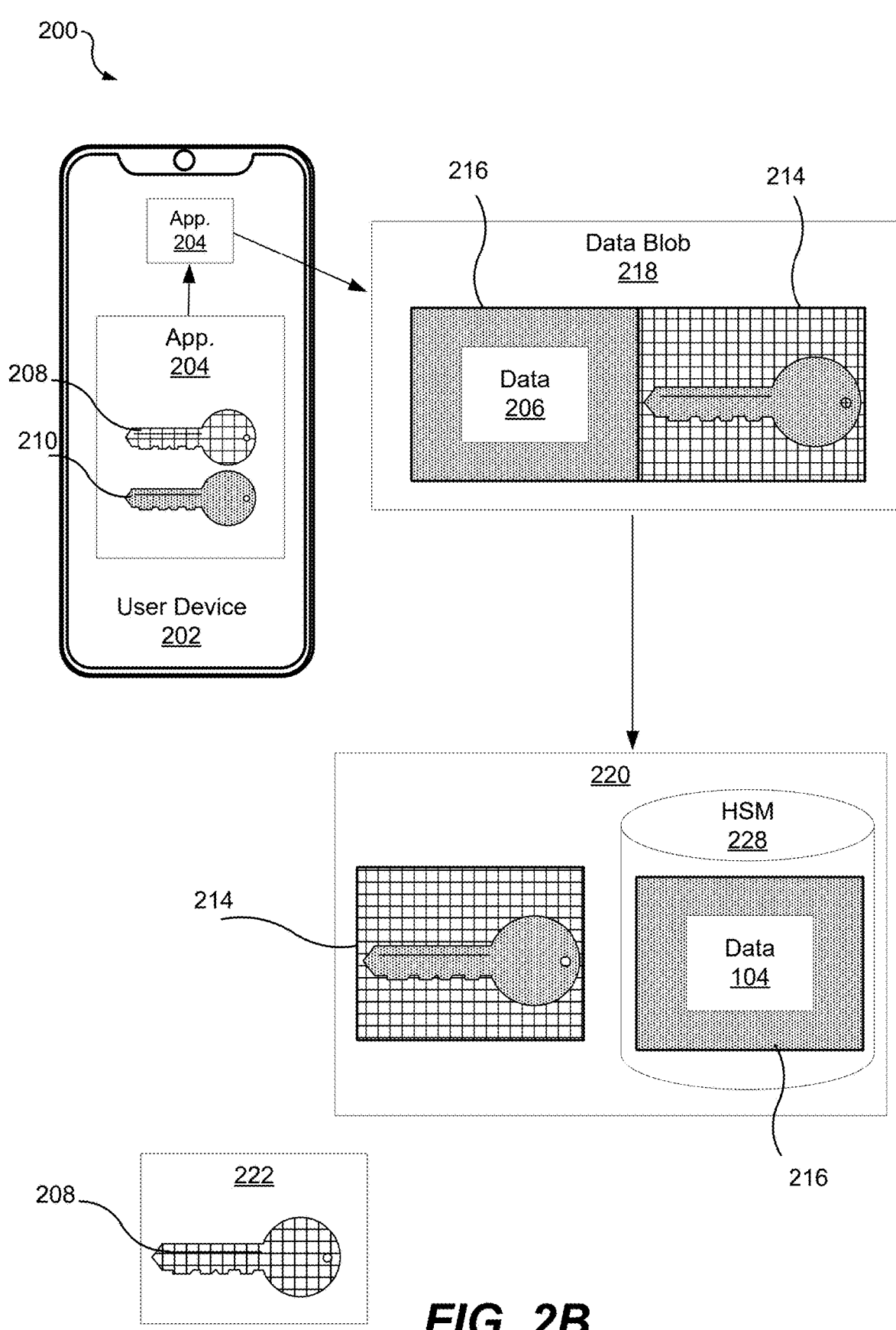

In FIG. 2B. the system 200 generates and transmits a data blob 218 to a first computing system 220. The first computing system 220 may be similar to the first computing system 106 in FIG. 1, and include similar components and configurations. Thus, the computing system may include one or more processors, computer-readable memories, and other such components. Some or all of the first computing system 220 may be cloud-based systems and/or physical machines and devices. The first computing system 220 may be associated with a PSP, responsible for processing some or all of the sensitive data of the data 206 in order to complete a transaction. The SE 250 may generate the data blob 218 to include at least the encrypted data 216 and the encrypted key 214. Because the data 206 is encrypted using a symmetrical key (the unique key 210) and an asymmetrical key, the data blob 218 may be encrypted using HPKE. As described above, the encrypted key 214 may include metadata, encrypted again using a second public-private key pair, shared between the user device 202 and a computing system

222 (similar to the second computing system 110 in FIG. 1). Thus, only the user device 202 and the computing system 222 may access the encrypted key 214. The metadata may include the other information associated with the data 206, such as the session token, the transaction ID, the device identifier (e.g., MAC ID. IP address, etc.), the device certificate (e.g., generated using a public-private key pair), and other such information.

The user device 202 may then transmit the data blob 218 to the first computing system 220 via the application 204. In some embodiments, the application 204 (and/or the SE 250) may cause some or all of the data 206, the encrypted data 216, and/or the encrypted key 214 to be deleted from the user device 202. Upon receiving the data blob 218, the first computing system 220 may split the data blob 218. For example, the first computing system 220 may access the encrypted key 214 and the encrypted data 216. However, the first computing system 220 may not have access to the server key 208 (or a portion thereof), as the server key 208 may only be shared between the user device 202 and another entity (e.g., the second computing system 222). Thus, the first computing system 220 may be unable to access the unique key 210 and decrypt the encrypted data 216. The first computing system 220 may therefore cause the encrypted data 216 to be stored, such as on an HSM 228 and/or on separate memory device. In some embodiments, the encrypted key 214 may be stored on the HSM 228. In other embodiments, the encrypted key 214 may be stored elsewhere (e.g., some other storage device) and/or subsequently deleted.

Figure 2C:
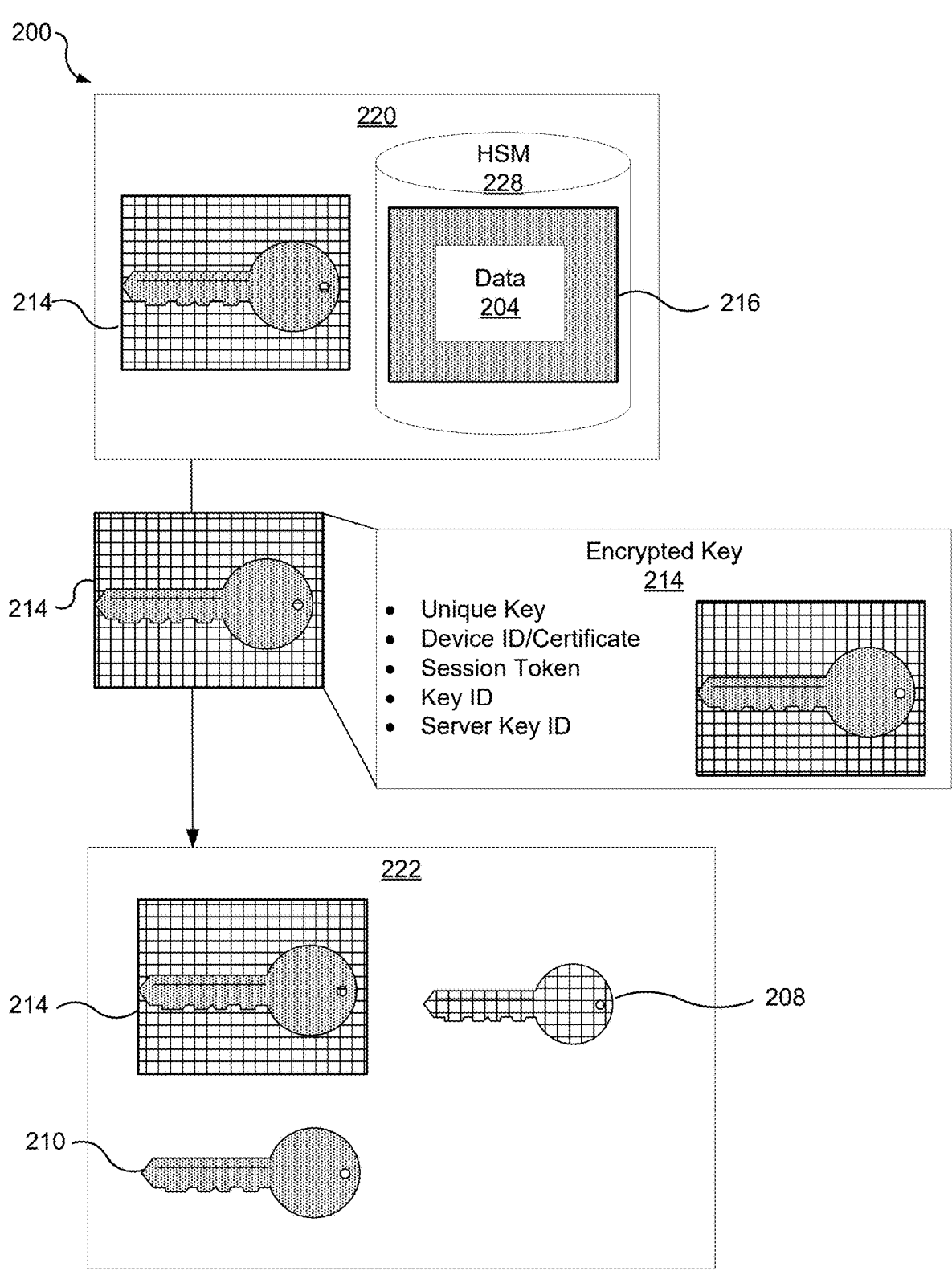

In FIG. 2C, the system 200 may transmit the encrypted key 214 to the second computing system 222. The second computing system 222 may be similar to the second computing system 110 in FIG. 1 and include similar components and configurations. Thus, the computing system may include one or more processors, computer-readable memories, and other such components. Some or all of the second computing system 222 may be cloud-based systems and/or physical machines and devices. Continuing the example from FIG. 2B, the computing system 220 may transmit the encrypted key 214 to the second computing system 222. As shown in FIG. 2C, the first computing system 220 may include information associated with the data 206 when transmitting the encrypted key 214. The other information may include some or all of the information encrypted with the unique key 210 by the application 204. The other information included by the computing system may be plaintext or may encrypted itself.

Like the second computing system 110 in FIG. 1, the second computing system 222 may be associated with the user device 202 and/or the application 204. Therefore, the second computing system 222 may access the server key 208. Using the server key 208 (e.g., the private portion of the server key 208), the second computing system 222 may decrypt the encrypted key 214. In some embodiments, the second computing system 222 may verify some or all of the information transmitted by the first computing system 220 with the encrypted key 214. For example, after decrypting the encrypted key 214. The second computing system 222 may access the other information encrypted by the application 204 and verify that some or all of the other information matches the information transmitted by the first computing system 220. The second computing system 222 may thereby verify that the encrypted key 214 is properly associated with the data 206.

Figure 2D:
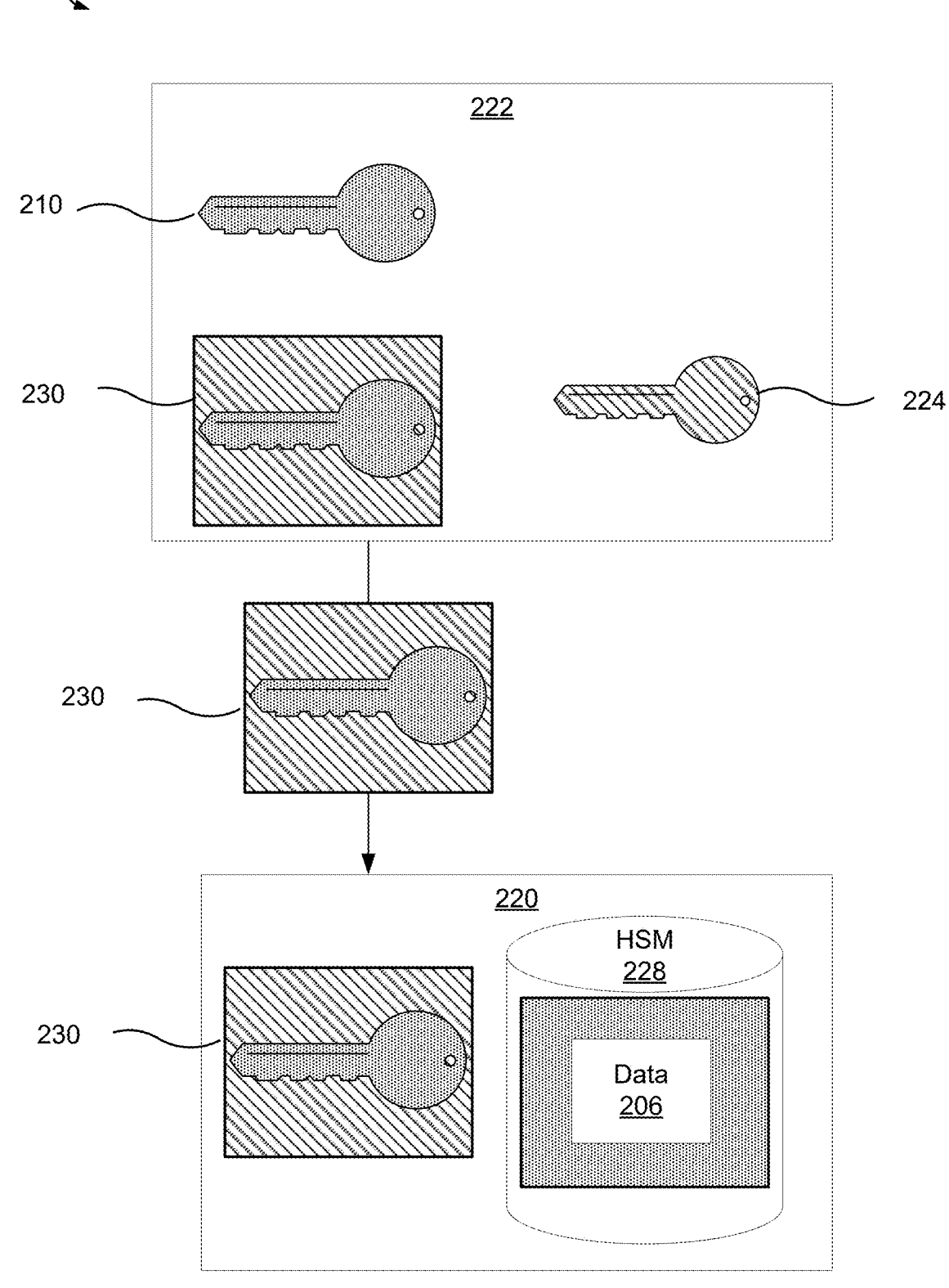

As shown in FIG. 2D, upon verifying that the encrypted key is associated with the data 206, the second computing system 222 may access a key encryption key (KEK) 224. The KEK 224 may be a symmetric key. The KEK 224 may only be shared between the computing systems 220 and 222. The second computing system 222 may access the KEK 224 based on the identity of the first computing system 220 as identified in the session token. Using the KEK 224, the second computing system 222 may re-encrypt the unique key 210 to create a re-encrypted key 230. The re-encrypted key 230 may include a certificate and/or signature from the second computing system 222. The certificate and/or signature may verify that the re-encrypted key 230 is generated by the second computing system 222. Other metadata may also be included with the re-encrypted key 230 (e.g., a transaction ID). The certificate and/or signature may therefore verify the authenticity of the other metadata.

Figure 2E:

Then, as shown in FIG. 2E, the first computing system 220 may access the KEK 224. Using the KEK 224, the first computing system 220 may decrypt the re-encrypted key 230 and access the unique key 210. The first computing system 220 may then use the unique key 210 to decrypt the encrypted data 216 and access the data 206. Finally, the first computing system 220 may process the data 206 accordingly, and the transaction associated with the data 206 may be completed.

In the example where the data 206 represents cardholder data, security of the cardholder data may be paramount. Additionally, there may be various security standards and regulations that govern the transmission and other handling of cardholder data to improve the security of the data. Any party that transmits, receives, and/or processes cardholder data may be responsible for adhering to these standards. However, maintaining the integrity of cardholder data may be resource intensive for each party responsible. Furthermore, as standards and regulations change, the steps needed to protect the data 206 may also change and require more and/or different resources. By using the systems and processes described in at least FIGS. 1-2E, the transfer and access of cardholder data may be minimized to just those parties that require decrypted cardholder data (e.g., a PSP using the second computing system 222). Other entities may facilitate the processing of the cardholder data without the possibility of accessing the cardholder data, saving resources and allowing for increased efficiency in adapting to new standards.

Similar efficiencies may be found if the data 206 represents other sensitive data. For example, if the data 206 represents health data, only a patient who provides the health data to the user device 202 and the end processor (e.g., a pharmacy or other medical services provider) may access the health data. By using encryption methods like HPKE and a third-party "source of truth," (e.g., the second computing system 222), no other parties may access the plaintext of the health data, as only the patient and the end processor have copies and/or access to the encrypted data 216, let alone the plaintext (e.g., the data 206).

Figure 3:
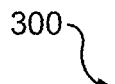
FIG. 3 illustrates a flowchart of a method 300 for accessing to encrypted sensitive data, according to certain embodiments.
Figure 3:
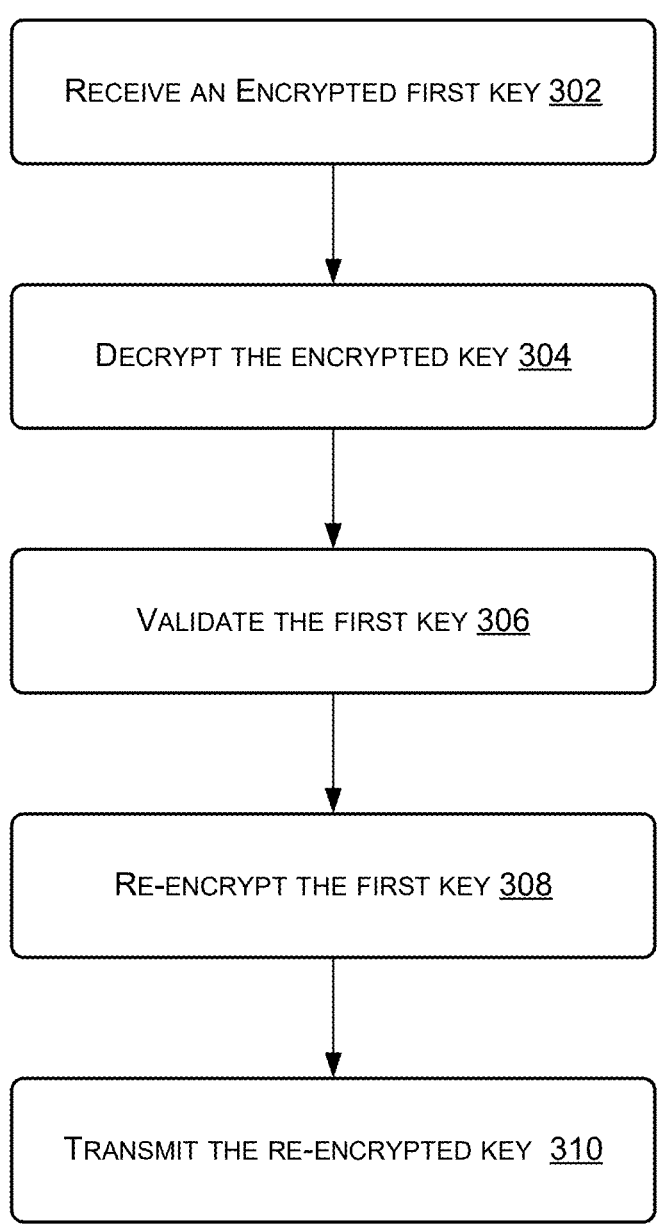

FIG. 3 illustrates a flowchart of a method 300 for accessing to encrypted sensitive data, according to certain embodiments. The method 300 may be performed by some or all of the systems and devices described herein. For example, the method 300 may be performed by the systems 100 and/or 200, working alone or in conjunction with each other. The steps of the method 300 may be performed in a different order than is shown and described, and/or some steps may be combined. In some embodiments, some steps may be skipped altogether.

At step 302, the method 300 may include receiving, by a first computing system and from a second computing system, an encrypted first key. The encrypted first key may be encrypted with a first public-private key pair. The encrypted first key may also include a hash of at least a portion of sensitive data. For example, the first computing system may be similar to the second computing system 222 in FIGS. 2C-2E. The sensitive data may therefore be similar to the data 206 and be collected or received by a user device (e.g., the user device 202) associated with the first computing system. The encrypted first key may be similar to the encrypted key 214, and be a symmetrical key generated by the user device.

The first encrypted key may also include other information associated with the sensitive data, such as a session ID (or token), a key identifier, a signature (e.g., a certificate verifying the source of the first encrypted key), a device signature (e.g., from the user device), and other such information. The other information may be included as plain text, or encrypted separately from the first encrypted key. The other information may be included with the key itself, or may be encrypted and sent with the key as the encrypted first key. The key itself may include a hash of at least a portion of the sensitive data such as a hash of a PIN and a hash of a PAN, associated with the user device (or a user thereof). The first public-private key pair may be similar to the server key 208 and be accessed only by the user device and the first computing system. Thus, any data encrypted using the first public-private key pair may only be decrypted by the first computing system.

At step 304, the method 300 may include decrypting, by the first computing system, the encrypted first key using a private key of the first public-private key pair. Decrypting the encrypted first key may provide access to a first key. The first key may be similar to the unique key 210 in FIGS. 2A-2E. Thus, the first key may be a random key. The first key may be unique to the sensitive data. In some embodiments, the first key may be based, at least in part, by a portion of the sensitive data.

At step 306, the method 300 may include validating, by the first computing system, the first key. The first computing system may utilize the information included in the encrypted first key and/or information included in the key itself. For example, the user device may encrypt the first key and the hash of the PIN and the hash of the PAN as an encrypted payload. Other information (e.g., a merchant ID) may be included the with the encrypted payload and transmitted to the second computing system as the encrypted first key. The second computing system may then transmit the other information and the encrypted payload to the first computing system. Upon decrypting the encrypted payload, the first computing system may access the hash of the PIN and the hash of the PAN to verify that the encrypted first key is associated with the sensitive data.

At step 308, the method 300 may include re-encrypting, by the first computing system, the first key using a second symmetric key to generate a re-encrypted key. The second public-private key pair may be similar to the KEK 224 in FIG. 2E. The second symmetric key may be shared only between the first and second computing systems. Thus, only the first and/or second computing systems may decrypt the re-encrypted key. The first key (e.g., the unique key 210) is therefore accessible by the second computing system.

At step 310, the method 300 may include transmitting, by the first computing system, the re-encrypted first key to the second computing system, such that the sensitive data may be decrypted. For example, the second computing system may be used by a PSP to store and process cardholder data. After decrypting the re-encrypted key, the second computing system may then access the sensitive data (e.g., cardholder data) and process the sensitive data in order to complete a transaction.

In some embodiments, the method 300 may include generating, by an application of the first computing system, the first key. For example, in the example shown in FIGS. 2A-2E, the SE 250 may be running on the user device 202, but associated with the second computing system 222. This association may permit sensitive data (and/or keys) to be obscured from a user of the user device. The method 300 may also include generating, by the application of the first computing system, a hash of at least a portion of the sensitive data. The hash may include the hash of the PIN, hash of the PAN, and/or any other portion of the data. The method 300 may also include encrypting, by the application of the first computing system, the sensitive data using the first key to generate encrypted sensitive data (e.g., the encrypted data 116 in FIG. 1). The method 300 may also include encrypting, by the application of the first computing system, the first key and the hash of the at least a portion of the sensitive data using the first public-private key pair to generate the encrypted first key. Because the first public-private key pair may only be accessible by the application and the first computing system, any other recipient of the encrypted first key may not be able to access the first key. The method 300 may also include transmitting, by the application of the first computing system, the encrypted first key and the encrypted data to the second computing system.

In the method described above, no individual system may be able to independently decrypt the sensitive data individually. For example, after the application generates the encrypted first key and the encrypted data, the application may cause one or both to be deleted from the application, in addition to the sensitive data itself. Thus, the first computing system (and therefore the application), may only access public-private key pairs in isolation from any other component. The first computing system may have no access or copy of the sensitive data or the encrypted data. The second computing system may have the encrypted data, but is unable to decrypt the first key in order to access the sensitive data, without verifying with the first computing system. Thus, the risk of exposure of the sensitive data may be reduced by segregating the data (and/or keys) available to each component performing the method.

Figure 4:
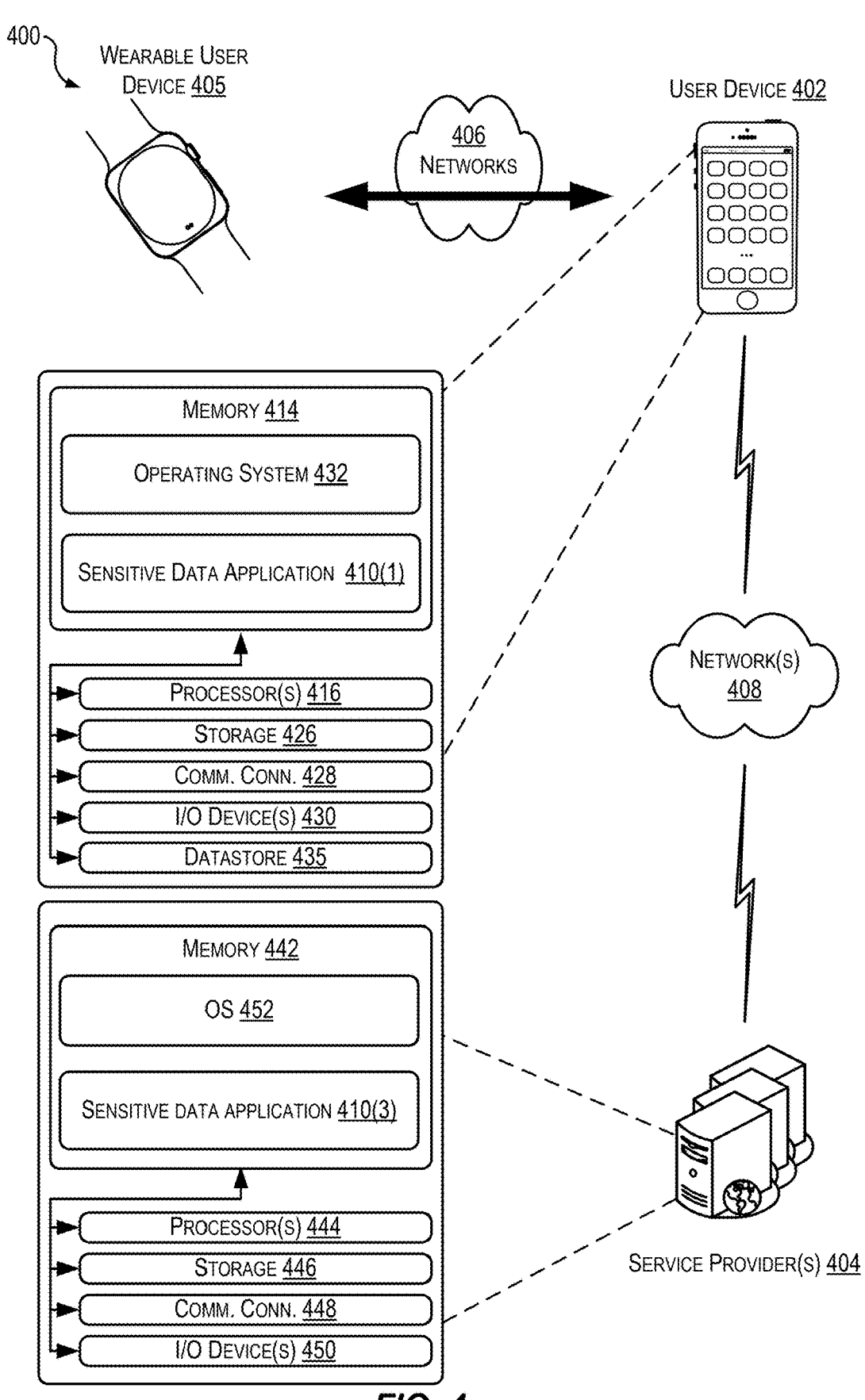
FIG. 4 illustrates an example architecture or environment configured to implement techniques relating to receiving and encrypting sensitive data, according to certain embodiments.

FIG. 4 illustrates an example architecture or environment 400 configured to implement techniques relating to receiving and encrypting sensitive data, according to certain embodiments. In some examples, the example architecture 400 may further be configured to enable a user device 402 (e.g., the user device 102), the service provider computers 404 (e.g., the service provider 404), and a wearable electronic device 405 (e.g., an example accessory deice) to share information. In some examples, the devices may be connected via one or more networks 408 and/or 406 (e.g., via Bluetooth, WiFi, the Internet, or the like). In the architecture 400, one or more users may utilize the user device 402 to manage, control, or otherwise utilize the wearable electronic device 405, via the one or more networks 406. Additionally, in some examples, the wearable electronic device 405, the service provider computers 404, and the user device 402 may be configured or otherwise built as a single device. For example, the wearable electronic device 405 and/or the user device 402 may be configured to implement the examples described herein as a single computing unit, exercising the examples described above and below without the need for the other devices described.

In some examples, the networks 406, 408 may include any one or a combination of many different types of networks, such as cable networks, the Internet, wireless networks, cellular networks, satellite networks, other private and/or public networks, or any combination thereof. While the illustrated example represents the user device 402 accessing the service provider computers 404 via the networks 408, the described techniques may equally apply in instances where the user device 402 interacts with the service provider computers 404 over a landline phone, via a kiosk, or in any other manner. It is also noted that the described techniques may apply in other client/server arrangements (e.g., set-top boxes, etc.), as well as in non-client/server arrangements (e.g., locally stored applications, peer to peer configurations, etc.).

The user device 402 may be any type of computing device such as, but not limited to, a mobile phone, a smartphone, a personal digital assistant (PDA), a laptop computer, a desktop computer, a thin-client device, a tablet computer, a wearable device, or the like. In some examples, the user device 402 may be in communication with the service provider computers 404 via the networks 408, 406, or via other network connections.

In one illustrative configuration, the user device 402 may include at least one memory 414 and one or more processing units (or processor(s)) 416. The processor(s) 416 may be implemented as appropriate in hardware, computer-executable instructions, firmware, or combinations thereof. Computer-executable instruction or firmware implementations of the processor(s) 416 may include computer-executable or machine-executable instructions written in any suitable programming language to perform the various functions described. The user device 402 may also include geo-location devices (e.g., a global positioning system (GPS) device or the like) for providing and/or recording geographic location information associated with the user device 402.

The memory 414 may store program instructions that are loadable and executable on the processor(s) 416, as well as data generated during the execution of these programs. Depending on the configuration and type of the user device 402, the memory 414 may be volatile (such as random access memory (RAM)) and/or non-volatile (such as read-only memory (ROM), flash memory, etc.). The user device 402 may also include additional removable storage and/or non-removable storage 426 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 414 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 414 and the additional storage 426, both removable and non-removable, are all examples of non-transitory computer-readable storage media. For example, non-transitory computer readable storage media may include volatile or non-volatile, removable or non-removable media implemented in any process or technology for storage of information such as computer-readable instructions, data structures, program modules, or other data. The memory 414 and the additional storage 426 are both examples of non-transitory computer storage media. Additional types of computer storage media that may be present in the user device 44 may include, but are not limited to, phase-change RAM (PRAM), SRAM, DRAM, RAM, ROM, Electrically Erasable Programmable Read-Only Memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 402. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

The user device 402 may also contain communications connection(s) 428 that allow the user device 402 to communicate with a data store, another computing device or server, user terminals, and/or other devices via the networks 408, 406. The user device 402 may also include I/O device(s) 430, such as a keyboard, a mouse, a pen, a voice input device, a touch input device, a display, an operating system 432 and/or one or more application programs or services for implementing the features disclosed herein including a sensitive data application 410(1). In some examples, the sensitive data application 410(1) may be configured to implement the features described herein such as those described with reference to the flowcharts. User device 402 may also include a datastore 435. The datastore 435 may be a separate memory partition within the memory 414 or may be an individual hardware component of the user device 402. The datastore 435 may be configured as a sensitive data datastore, and may not be accessible to a user of the user device 402.

The service provider computers 404 may also be any type of computing device such as, but not limited to, a mobile phone, a smartphone, a PDA, a laptop computer, a desktop computer, a thin-client device, a tablet computer, a wearable device, a server computer, a virtual machine instance, etc. In some examples, the service provider computers 404 may be in communication with the user device 402 and/or the wearable user device 405 via the networks 408, 406, or via other network connections. The user device 402 may communicate with the sensitive data datastore 435 via the service computers 404 (e.g., to transmit the encrypted key 214 and encrypted data 216 to the first computing system 220 in FIG. 2B).

In one illustrative configuration, the service provider computers 404 may include at least one memory 442 and one or more processing units (or processor(s)) 444. The processor(s) 444 may be implemented as appropriate in hardware, computer-executable instructions, firmware, or combinations thereof. Computer-executable instruction or firmware implementations of the processor(s) 444 may include computer-executable or machine-executable instructions written in any suitable programming language to perform the various functions described.

The memory 442 may store program instructions that are loadable and executable on the processor(s) 444, as well as data generated during the execution of these programs. Depending on the configuration and type of service provider computer 404, the memory 442 may be volatile (such as RAM) and/or non-volatile (such as ROM, flash memory, etc.). The service provider computer 404 may also include additional removable storage and/or non-removable storage 446 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 442 may include multiple different types of memory, such as SRAM, DRAM, or ROM. While the volatile memory described herein may be referred to as RAM, any volatile memory that would not maintain data stored therein once unplugged from a host and/or power would be appropriate. The memory 442 and the additional storage 446, both removable and non-removable, are both additional examples of non-transitory computer-readable storage media.

The service provider computer 404 may also contain communications connection(s) 448 that allow the service provider computer 404 to communicate with a data store, another computing device or server, user terminals and/or other devices via the networks 408, 406. The service provider computer 404 may also include I/O device(s) 450, such as a keyboard, a mouse, a pen, a voice input device, a touch input device, a display, speakers, a printer, etc. The memory 442 may include an operating system 452 and/or one or more application programs or services for implementing the features disclosed herein including the sensitive data application 410(3). This version of the sensitive data application may be configured to perform similar operations as the sensitive data application 410(1). Thus, in some examples, the sensitive data application 410(3) may be configured to implement the features described herein such as those described with reference to the flowcharts.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In examples utilizing a network server, the network server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft® Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or browser. It should be appreciated that alternate examples may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable media for containing code, or portions of code, can include any appropriate media known or used in the art, including storage media, such as, but not limited to, volatile and non-volatile, removable and non-removable media implemented in any method or technology for storage of information such as computer-readable instructions, data structures, program modules, or other data, including RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a system device. Based at least in part on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed blocks for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services or other services relating to health record management, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain financial applications, data de-identification can be used to protect a user's privacy and/or sensitive data. De-identification may be facilitated, when appropriate, by removing specific identifiers (e.g., date of birth), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method, comprising:

receiving, by a first computing system and from a second computing system, an encrypted first key encrypted with a first public-private key pair and comprising a hash of at least a portion of sensitive data;

decrypting, by the first computing system, the encrypted first key using a private key of the first public-private key pair to access a first key;

validating, by the first computing system, the first key;

re-encrypting, by the first computing system, the first key using a symmetric key to generate a re-encrypted key; and transmitting, by the first computing system, the re-encrypted key to the second computing system such that the sensitive data may be decrypted.

2. The method of claim 1, further comprising:

generating, by an application of the first computing system, the first key;

generating, by the application of the first computing system, a hash of a at least a portion of the sensitive data;

encrypting, by the application of the first computing system, the sensitive data using the first key to generate encrypted data;

encrypting, by the application of the first computing system, the first key and the hash of the at least a portion of the sensitive data using the first public-private key pair to generate the encrypted first key; and transmitting, by the application of the first computing system, the encrypted first key and the encrypted data to the second computing system.

3. The method of claim 1, wherein the second computing system receives a data blob comprising the sensitive data and the encrypted first key from an application of the first computing system.

4. The method of claim 3, wherein the second computing system splits the data blob and stores the sensitive data.

5. The method of claim 1, wherein the sensitive data comprises health data.

6. The method of claim 1, wherein the first key is unique to the sensitive data.

7. The method of claim 1, wherein the sensitive data includes one or more of a server identifier, a session token, a certificate, a transaction identifier, or a user device identifier.

8. The method of claim 1, wherein the first key is associated with a symmetrical encryption scheme.

9. The method of claim 1, wherein the first computing system includes a hardware security module.

10. The method of claim 1, wherein the re-encrypted key includes a signature from the first computing system such that the second computing authenticates the re-encrypted key.

11. A computing system, comprising:

a computing system;

one or more processors; and a computer-readable medium comprising instructions that, when executed by the one or more processors, cause the computing system to perform operations to:

receive, by the computing system and from an entity, an encrypted first key encrypted with a first public-private key pair and comprising a hash of at least a portion of sensitive data;

decrypt, by the computing system, the encrypted first key using a private key of the first public-private key pair to access a first key;

validate, by the computing system, the first key;

re-encrypt, by the computing system, the first key using a symmetric key to generate a re-encrypted key; and transmit, by the computing system, the re-encrypted key to the entity such that the sensitive data may be decrypted.

12. The computing system of claim 11, further comprising an application, wherein the instructions further cause the computing system to:

generate, by the application of the computing system, the first key;

generate, by the application of the computing system, a hash of at least a portion of the sensitive data;

encrypt, by the application of the computing system, the sensitive data using the first key to generate encrypted data;

encrypt, by the application of the computing system, the first key and the hash of the at least a portion of the sensitive data using the first public-private key pair to generate the encrypted first key; and transmit, by the application of the first computing system, the encrypted first key and the encrypted data to the entity.

13. The computing system of claim 12, wherein the application is hosted on a user device configured to collect sensitive data via optical code.

14. The computing system of claim 12, wherein the application causes the sensitive data and/or the encrypted sensitive data to be deleted after transmitting the encrypted first key and the encrypted sensitive data to the entity.

15. The computing system of claim 11, wherein the sensitive data comprises at least one of card holder data, a personal identification number, or a primary account number.

16. A non-transitory computer-readable medium comprising instructions that, when executed by one or more processors, cause the one or more processors to perform operations comprising:

receiving, by a first computing system and from a second computing system, an encrypted first key encrypted with a first public-private key pair and comprising a hash of at least a portion of sensitive data;

decrypting, by the first computing system, the encrypted first key using a private key of the first public-private key pair to access a first key;

validating, by the first computing system, the first key;

re-encrypting, by the first computing system, the first key using a symmetric key to generate a re-encrypted key; and transmitting, by the first computing system, the re-encrypted key to the second computing system such that the sensitive data may be decrypted.

17. The non-transitory computer-readable medium of claim 16, the operations further comprising:

generating, by an application of the first computing system, the first key;

generating, by the application of the first computing system, a hash of a at least a portion of the sensitive data;

encrypting, by the application of the first computing system, the sensitive data using the first key to generate encrypted data;

encrypting, by the application of the first computing system, the first key and the hash of the at least a portion of the sensitive data using the first public-private key pair to generate the encrypted first key; and transmitting, by the application of the first computing system, the encrypted first key and the encrypted data to the second computing system.

18. The non-transitory computer-readable medium of claim 17, wherein the application is hosted on a user device configured to collect sensitive data via near field communication, magnetic strip reading, and/or a user input.

19. The non-transitory computer-readable medium of claim 16, wherein the sensitive data includes one or more of a server identifier, a session token, a certificate, a transaction identifier, or a user device identifier.

20. The non-transitory computer-readable medium of claim 16, wherein the encrypted first key is associated with a symmetrical encryption scheme.

\* \* \* \* \*